(12) United States Patent
Kobayashi et al.

(10) Patent No.: US 9,370,998 B2
(45) Date of Patent: Jun. 21, 2016

(54) FUEL FILLER SYSTEMS AND METHODS OF ASSEMBLING SAME

(71) Applicants: Kazuhiro Kobayashi, Dublin, OH (US); Hidekazu Nobata, Dublin, OH (US); Masaru Tomimatsu, Dublin, OH (US); Hiroyuki Hagano, Kiyosu (JP)

(72) Inventors: Kazuhiro Kobayashi, Dublin, OH (US); Hidekazu Nobata, Dublin, OH (US); Masaru Tomimatsu, Dublin, OH (US); Hiroyuki Hagano, Kiyosu (JP)

(73) Assignee: Honda Motor Co., Ltd., Tokyo (JP)

( * ) Notice: Subject to any disclaimer, the term of this patent is extended or adjusted under 35 U.S.C. 154(b) by 160 days.

(21) Appl. No.: 14/032,714

(22) Filed: Sep. 20, 2013

(65) Prior Publication Data

US 2015/0083720 A1 Mar. 26, 2015

(51) Int. Cl.
*B60K 15/04* (2006.01)

(52) U.S. Cl.
CPC .......... *B60K 15/04* (2013.01); *B60K 2015/047* (2013.01); *B60K 2015/0461* (2013.01); *Y10T 29/49826* (2015.01)

(58) Field of Classification Search
CPC ............. B60K 2015/048; B60K 2015/0477; B60K 2015/047; B60K 2015/0474; B60K 2015/0483; B60K 2015/049; B60K 15/04; B60K 2015/0461; F16J 15/3224; Y10T 29/49826; F16L 37/088
See application file for complete search history.

(56) References Cited

U.S. PATENT DOCUMENTS

| | | | | |
|---|---|---|---|---|
| 4,898,395 A | * | 2/1990 | Kawase | 277/615 |
| 4,995,433 A | * | 2/1991 | Beicht et al. | 141/312 |
| 5,228,729 A | * | 7/1993 | McElroy | F16L 37/0987 285/319 |
| 5,427,263 A | * | 6/1995 | Bowles | 220/86.2 |
| 5,937,922 A | | 8/1999 | Hor et al. | |
| 6,079,579 A | * | 6/2000 | De Cuyper | 215/41 |
| 6,338,362 B1 | | 1/2002 | Gabbey et al. | |
| 6,447,026 B2 | | 9/2002 | Palvoelgyi | |
| 6,502,607 B2 | | 1/2003 | Brown et al. | |
| 6,619,343 B2 | | 9/2003 | Stoddart et al. | |
| 6,722,407 B2 | | 4/2004 | Henry | |
| 8,047,393 B2 | | 11/2011 | Feichtinger | |
| 2007/0056654 A1 | | 3/2007 | Poley et al. | |
| 2011/0180176 A1 | | 7/2011 | Girgenrath | |
| 2013/0186894 A1 | * | 7/2013 | Salzberger et al. | 220/86.2 |
| 2014/0326724 A1 | * | 11/2014 | Steinmann et al. | 220/86.1 |

* cited by examiner

*Primary Examiner* — Andrew Perreault
(74) *Attorney, Agent, or Firm* — Armstrong Teasdale LLP

(57) ABSTRACT

Systems and methods for assembling a fuel filler system for use in a vehicle are provided. The fuel filler system includes a closure device assembly and a fuel filler tube. A circumferential rim extends radially outwardly from a first end of the fuel filler tube. The rim has a non-planar cross-sectional shape. The fuel filler system also includes at least one catch member that extends from an inner surface of the closure device assembly. A seal member encircles a portion of the closure device assembly, and is axially spaced apart from the at least one catch member. After the closure device assembly is coupled to the fuel filler tube, the circumferential rim is axially captured between the at least one catch member and the seal member.

14 Claims, 3 Drawing Sheets

FUEL FILLER SYSTEMS AND METHODS OF ASSEMBLING SAME

BACKGROUND

The present disclosure relates generally to vehicles, and more specifically, to methods for assembling fuel filler systems for use in vehicles.

At least some known vehicles include fuel filler systems that use a fuel filler tube adapted at a first end to receive fuel and coupled at a second end to a fuel tank. The first end of the fuel filler tube is coupled to a vehicle body, typically within a recess defined a distance from an outer wall of the vehicle body. A door mounted in the outer wall provides access to the recess. It is common for a fuel cap to be removably coupled to the first end to provide access during fueling and to close the first end during operation of the vehicle. More recently, some vehicles have included capless fuel filler systems that provide access to the first end without removal of a fuel cap. At least some known capless fuel filler systems include a closure device that is coupled to the first end of the fuel filler tube. More specifically, in at least some known vehicle fuel systems, the closure device is inserted into the first end of the fuel filler tube, and is oriented to enable a fuel pump nozzle to be inserted therein.

In at least some known capless fuel filler systems, the closure devices, during operation of the vehicle, substantially seal the fuel filler tube to substantially prevent fuel fumes from escaping the fuel filler tube, and to substantially prevent water or other contaminants from entering the fuel system. In such capless fuel filler systems, no additional cover or cap is used to control access to the fuel filler tube and/or closure device, apart from the door mounted in the outer wall of the vehicle body.

In at least some known fuel filler systems, the closure device assembly is secured to the first end of the fuel filler tube via a snap-fit coupling mechanism. The snap-fit coupling mechanism includes a circumferentially-extending, outwardly projecting planar flange formed on the first end of the fuel filler tube. The outwardly-projecting flange engages at least one catch member that extends inwardly from an inner surface of an outer cover of the closure device assembly. The cylindrical portion of the outer cover is sized to fit around the first end of the fuel filler tube. To couple the closure device assembly to the fuel filler tube, the first end of the fuel filler tube is inserted into the cylindrical portion of the outer cover, until the flange on the first end of the fuel filler tube is forced past and captured by the at least one catch member.

In addition, in at least some known fuel filler systems that include a snap-fit structure as described above, an O-ring seal member is interposed between an inner surface of the fuel filler tube and an outer surface of the closure device. The O-ring seal member is used to create a seal between the fuel filler tube and the closure device assembly, to prevent the leakage of fumes from the fuel filler tube, and to prevent entry of water or other contaminants into the fuel filler tube.

However, in such snap-fit assembly structures as described above that include flanges, the flanges may be permanently deformed during the assembly process. In addition, a high degree of precision is used to form the flanges on the ends of the fuel filler tubes, involving an additional and/or a more complicated manufacturing process, which in turn may lead to increased manufacturing costs. In addition, the use of an O-ring involves a high degree of precision in the manufacture of the fuel filler tube and the closure device, particularly in the locations where the O-ring is positioned. Furthermore, O-rings may become twisted or otherwise deformed during assembly of the fuel filler system. Such twisting or deformation of the O-ring may adversely affect the seal created by the O-ring.

BRIEF DESCRIPTION

In one embodiment, a fuel filler system for use in a vehicle is provided. The fuel filler system includes a fuel filler tube including a tube end and a longitudinal axis. The fuel filler system also includes a closure device assembly coupleable with the tube end. The fuel filler system also includes a circumferential rim that extends radially outwardly from the tube end. The circumferential rim defines a non-planar cross-sectional shape. At least one catch member extends from an inner surface of the closure device assembly. A seal member encircles a portion of the closure device assembly, and is axially spaced apart from the at least one catch member. After the closure device assembly is coupled to the fuel filler tube, the circumferential rim is axially captured between the at least one catch member and the seal member.

In another embodiment, a method for assembling a fuel filler system for use in a vehicle is provided. The method includes providing a fuel filler tube, wherein the fuel filler tube includes a first end, a longitudinal axis and a circumferential rim that extends radially outwardly from the first end and defines a non-planar cross-sectional shape. The method also includes coupling a closure device assembly to the fuel filler tube, wherein the closure device assembly includes an outer cover with an inner surface, with at least one catch member oriented on the inner surface, and wherein a circumferentially-extending seal member is oriented on the closure device assembly and axially spaced apart from the at least one catch member, such that the circumferential rim is axially captured between the at least one catch member and the seal member.

The features, functions, and advantages that are discussed can be achieved independently in various embodiments or may be combined in yet other embodiments, further details of which can be seen with reference to the following description and drawings.

DETAILED DESCRIPTION

The fuel filler systems and assembly methods described herein overcome at least some limitations of known vehicle fuel filler systems by providing a closure device assembly that is mounted within a fuel filler tube end such that the use of an O-ring is avoided. Accordingly, the risk of twisting or other deformation of the O-ring and corresponding compromise of the seal between the tube end and closure device assembly is also avoided. In addition, the increased costs that may be associated with the use of an O-ring may be avoided. The fuel filler systems and assembly methods described herein also avoid the use of a circumferential planar flange to couple the fuel filler tube to the closure device assembly. Accordingly, the risk of permanent deformation of the planar flange during coupling of the tube end to the closure device assembly is also avoided. In addition, the increased costs associated with forming the planar flange on the fuel filler tube end are also avoided.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 1:
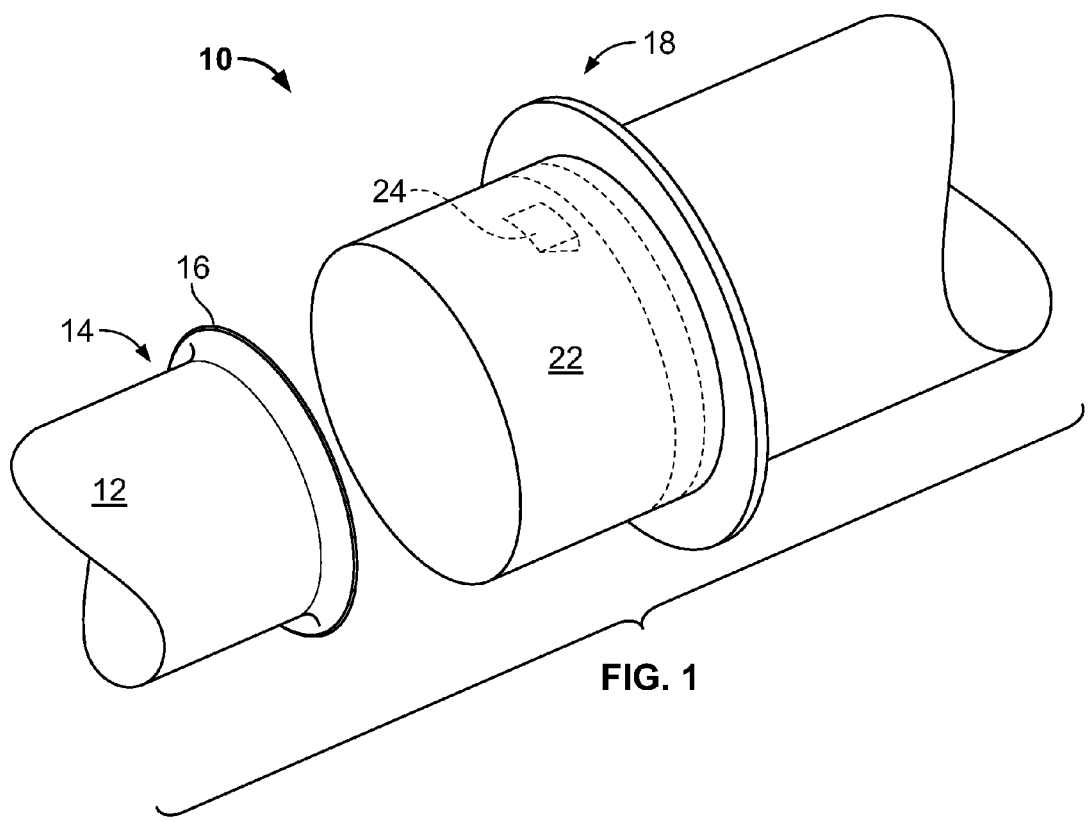
FIG. 1 is an exploded perspective view of an exemplary vehicle fuel filler system.
Figure 2:
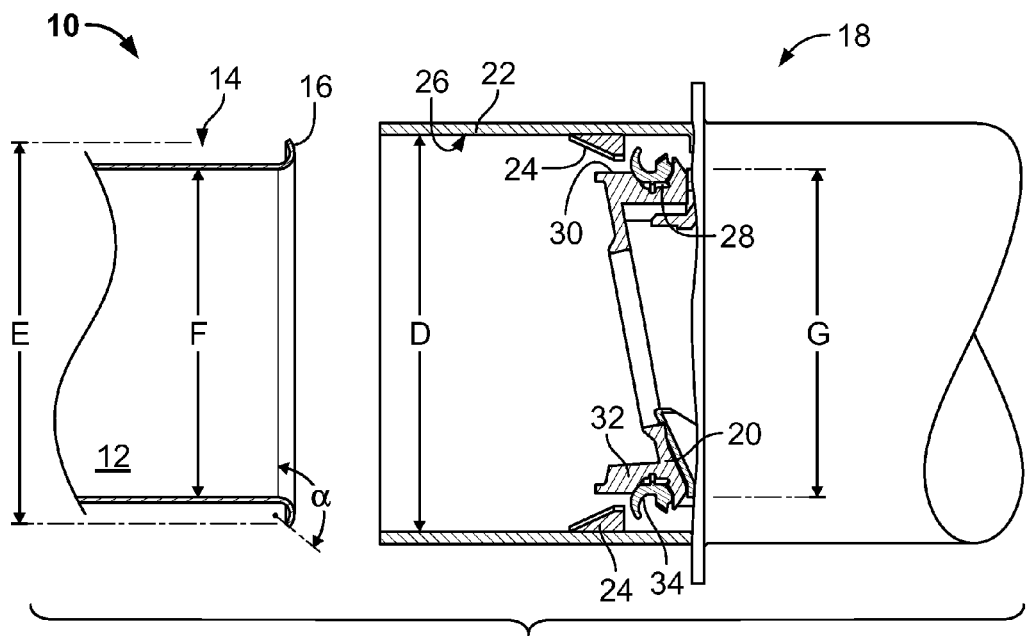
FIG. 2 is an exploded side sectional view of the fuel filler system shown in FIG. 1.
Figure 3:
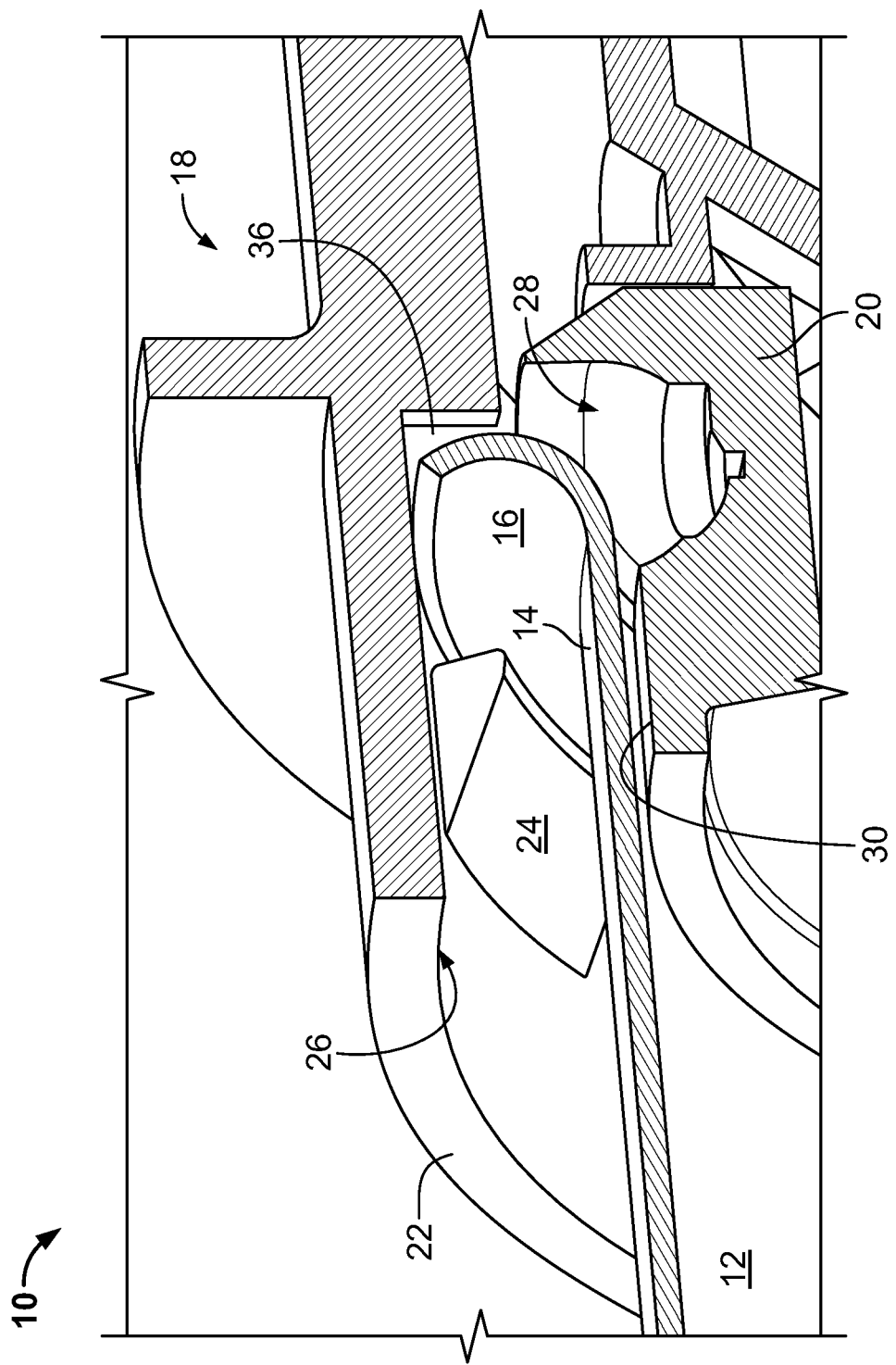
FIG. 3 is an enlarged perspective sectional view of the fuel filler system shown in FIG. 1, in an assembled state.

FIGS. 1-3 illustrate an exemplary fuel filler tube system 10. Specifically, FIG. 1 is a perspective exploded view of fuel filler system 10, and FIG. 2 is a side sectional view of fuel filler system 10. Fuel filler system 10 includes a fuel filler tube 12. In the exemplary embodiment, fuel filler tube 12 is fabricated from at least one metallic material. In alternative embodiments, fuel filler tube 12 is fabricated from any suitable material that enables fuel filler system 10 to function as described herein. Fuel filler tube 12 includes a tube end 14. A circumferential rim 16 extends outwardly from tube end 14. Rim 16 has a curved cross-sectional shape that describes an arc that covers an angle α. In the exemplary embodiment, angle α is at least 90°, as illustrated in FIG. 2. In alternative embodiments, angle α has any value that enables fuel filler system 10 to function as described herein. Moreover, while rim 16 is shown having a smoothly-curved cross-sectional shape, in alternative embodiments, rim 16 has any non-planar cross-sectional shape that enables rim 16 to function as described herein. By providing rim 16 with a non-planar, and specifically, a curved cross-sectional shape, rim 16 is provided with greater strength and rigidity relative to a comparably-sized circumferentially-extending planar or flat flange.

Fuel filler system 10 also incorporates a closure device assembly 18. Assembly 18 is configured such that, after insertion into fuel filler tube 12, closure device assembly selectively seals fuel filler tube 12 to substantially prevent fuel fumes from escaping fuel filler tube 12, and to substantially prevent water or other contaminants from entering fuel filler system 10.

In the exemplary embodiment, except as specifically described herein, closure device assembly 18 has any suitable configuration that enables fuel filler system 10 to function as described herein, including a capless configuration. Moreover, in the exemplary embodiment, closure device assembly 18 is fabricated from any combination of metallic, non-metallic or other materials, that enables closure device assembly 18 to function as described herein.

Closure device assembly 18 includes a closure device 20 coupled to a cylindrical outer cover 22. Outer cover 22 has an inner diameter D that is greater than an outer diameter E of rim 16. Outer cover 22 includes catch members 24 that project inwardly from, an inner surface 26 of outer cover 22. Catch members 24 are circumferentially arranged around inner surface 26. In addition, catch members 24 are wedge-shaped to facilitate coupling of tube end 14 to closure device assembly 18 as described in further detail herein. In the exemplary embodiment, two catch members 24 are included, as shown in FIG. 2. However, in alternative embodiments, any number of catch members 24 may be included that enables fuel filler system 10 to function as described herein. Closure device 20 also includes an inner collar 32. Furthermore, a circumferential notch 28 is defined in an outwardly-facing surface 30 of inner collar 32. Notch 28 is axially spaced apart from catch members 24.

A circumferentially-extending seal member 34 is coupled to closure device 20 and positioned partially within notch 28. Accordingly, at least portions of seal member 34 are likewise axially spaced apart from catch members 24. Seal member 34 is fabricated from any suitable resilient material that enables fuel filler system 10 to function as described herein. In the exemplary embodiment, seal member 34 has a curved, "C-shaped" cross-sectional shape of varying thickness. A flexible lip portion 44 (shown in FIG. 4) of seal member 34 is oriented toward rim 16. Lip portion 44 has a decreasing cross-sectional thickness. In an alternative embodiment (not shown), lip portion 44 has a constant cross-sectional thickness that is less than a remaining portion of seal member 34. In the exemplary embodiment, the "C-shaped" cross-section of seal member 34 is oriented to be open outwardly, relative to surface 30 of inner collar 32.

In the exemplary embodiment, tube end 14 has an inner diameter F that is greater than an outer diameter G of inner collar 32. Moreover, outer diameter E of rim 16 is less than an inner diameter D of outer cover 22, leaving a cylindrical clearance between rim 16 and inner surface 26. Catch members 24 project inwardly from inner surface 26 a sufficient distance that upon insertion of tube end 14 into closure device assembly 18, rim 16 contacts catch members 24.

FIG. 3 is an enlarged perspective sectional view of fuel filler system 10, as assembled. Seal member 34 (shown in FIGS. 1 and 2) is omitted from FIG. 3 for simplicity of illustration. In the assembled orientation, rim 16 is captured between at least one catch member 24 and an inner shoulder 36 of closure device assembly 18. In the exemplary embodiment, rim 16 is spaced a small distance from inner surface 26 of outer cover 22, as contact between rim 16 and inner surface 26 is not used for establishing a seal between tube end 14 and closure device 20.

Figure 4:
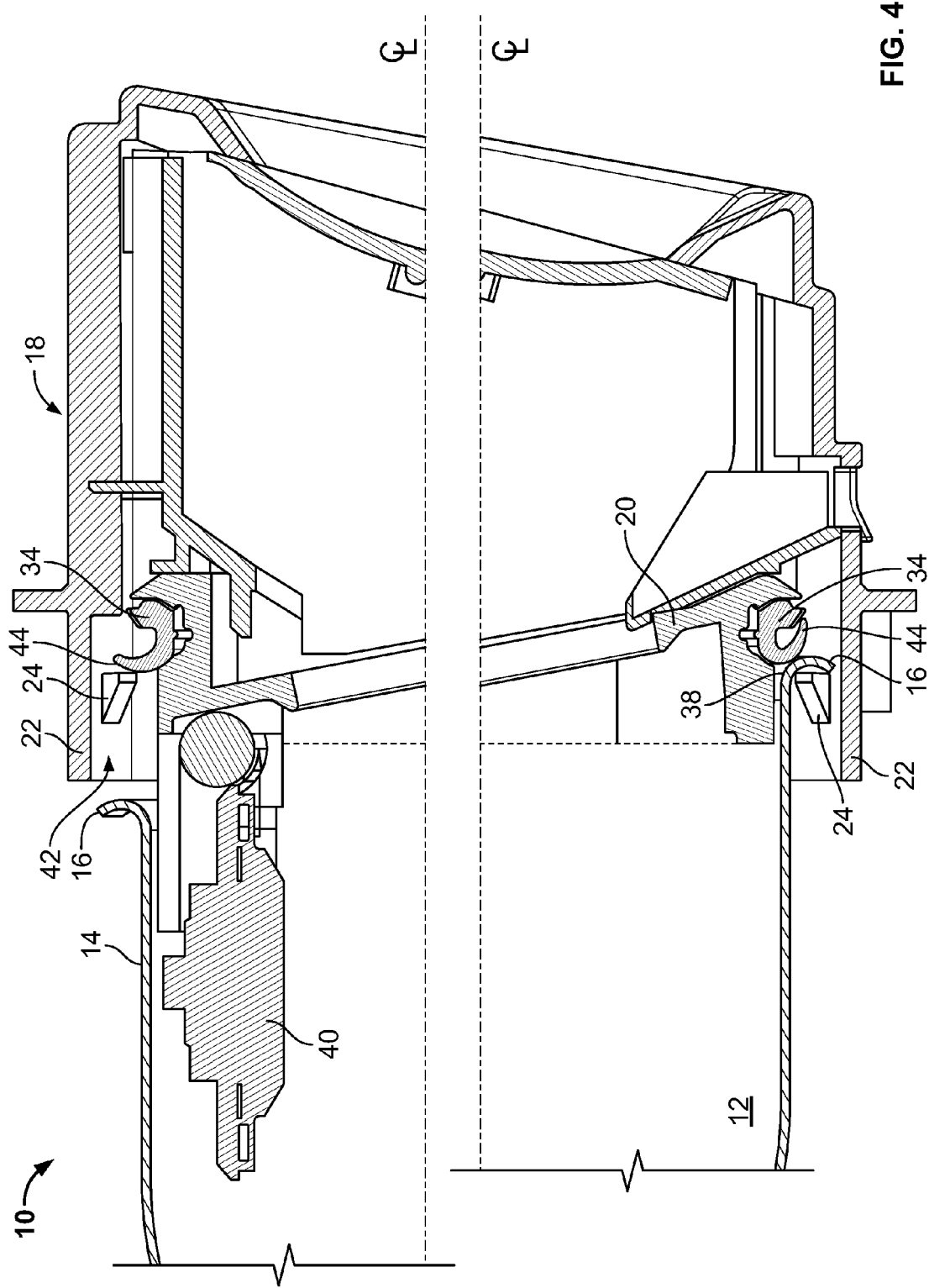
FIG. 4 is a side sectional view of the fuel filler system shown in FIG. 1, illustrating an exemplary method that may be implemented to assemble the fuel filler system.

FIG. 4 illustrates an exemplary method for assembling fuel filler system 10. An upper portion of FIG. 4 shows fuel filler system 10 before tube end 14 is coupled to closure device assembly 18. A lower portion of FIG. 4 shows fuel filler system 10 before tube end 14 is coupled to closure device assembly 18. Accordingly, fuel filler system 10 is fully assembled in the lower portion of FIG. 4. Closure device assembly 18 and fuel filler tube 12 share a common center axis CL.

As shown in the upper portion of FIG. 4, fuel filler system 10 is assembled by first inserting tube end 14 into closure device assembly 18. Closure device assembly 18 includes a door 40 that extends into fuel filler tube 12 when a fuel pump nozzle (not shown) is inserted into closure device assembly 18. Other portions of closure device assembly 18 are omitted from FIG. 4 for clarity of illustration. Rim 16 is inserted into an annular gap 42 defined between outer cover 22 and inner collar 32 (shown in FIG. 2). Accordingly, inner collar 32 is inserted inside of tube end 14, while outer cover 22 surrounds tube end 14.

Continued insertion of tube end 14 into closure device assembly 18 causes rim 16 to contact catch members 24, as described above. In the exemplary embodiment, rim 16 is configured such that at least some portions of rim 16 deflect slightly inwardly, when tube end 14 and closure device assembly 18 are pushed toward each other with an amount of coupling force greater than a predetermined amount of force. The deflection of rim 16 enables rim 16 to be pushed past catch members 24. After rim 16 passes catch members 24, fuel filler tube 12 and rim 16 are oriented as shown in the lower half of FIG. 4. In the exemplary embodiment, rim 16 is fabricated such that the previously-deflected portions of rim 16 return to their original positions, as shown in FIGS. 1-3, without significant permanent deformation of rim 16.

As fuel filler tube 12 is inserted into closure device assembly 18, and rim 16 is pushed past catch members 24, a sealing surface 38 of rim 16 contacts and deflects a flexible lip portion 44 of seal member 34, as illustrated in the lower portion of FIG. 4. Accordingly, a surface contact seal is created between sealing surface 38 and lip portion 44. Seal member 34 is less susceptible than an O-ring to undesired distortion that would adversely affect the resulting seal. In the exemplary embodiment, rim 16, catch member 24, and seal member 34 are configured such that after tube end 14 is fully inserted into closure device assembly 18, both a tight seal and a secure mechanical coupling is provided between tube end 14 and closure device assembly 18.

The above-described systems and methods overcome at least some disadvantages of known fuel filler systems. More specifically, the fuel filler system described herein uses a curved rim on the fuel filler tube instead of a circumferentially-extending planar flange. This facilitates the use of less expensive formation equipment and processes for the manufacture of the fuel filler tube. The curved rim has increased strength and resistance to permanent deformation during assembly of the fuel filler system. In addition, the curved rim provides a sealing surface for defining a surface contact seal between the rim and the seal member. Furthermore, the fuel filler system described herein uses a seal member to create a surface contact seal that is more secure and less susceptible to undesired deformation than an O-ring.

Exemplary embodiments of a fuel filler system and method of assembly of same are described above in detail. The systems and methods are not limited to the specific embodiments described herein, but rather, components of the systems and/or steps of the methods may be utilized independently and separately from other components and/or steps described herein. For example, the systems may also be used in combination with other manufacturing systems and methods, and is not limited to practice with only the manufacturing systems and methods as described herein. Rather, an exemplary embodiment can be implemented and utilized in connection with many other vehicle assembly system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fuel filler system for use in a motor vehicle, said fuel filler system comprising:
    a fuel filler tube including a tube end and a longitudinal axis;
    a closure device assembly coupleable with said tube end, wherein said closure device assembly comprises an inner collar and an outer cover;
    a circumferential rim extending radially outward from said tube end, said circumferential rim defining a non-planar cross-sectional shape and comprising a curved sealing surface extending radially outward from said tube end;
    at least one catch member extending from an inner surface of said outer cover of said closure device assembly, wherein said outer cover and said inner collar define an annular gap that receives said circumferential rim after said closure device assembly is coupled to said fuel filler tube; and
    a seal member circumferentially coupled to a portion of said closure device assembly via a circumferential notch defined in a radially outwardly-facing surface of said inner collar, and axially spaced apart from said at least one catch member, wherein said circumferential rim is axially captured between said at least one catch member and said seal member such that said sealing surface sealingly engages said seal member.

2. The fuel filler system in accordance with claim 1, wherein said cross-sectional shape of said circumferential rim defines an arc extending an angle $\alpha$, wherein $\alpha$ is greater than 90°.

3. The fuel filler system in accordance with claim 1, wherein said seal member has a C-shaped cross-sectional shape.

4. The fuel filler system in accordance with claim 3, wherein said seal member includes a flexible lip portion.

5. The fuel filler system in accordance with claim 4, wherein said flexible lip portion is oriented toward said circumferential rim.

6. The fuel filler system in accordance with claim 1, wherein said at least one catch member is wedge-shaped to cause said circumferential rim to resiliently deflect when said closure device assembly is coupled to said fuel filler tube.

7. The fuel filler system in accordance with claim 1, wherein said closure device assembly is a capless closure device assembly.

8. A method for assembling a fuel filler system for use in a motor vehicle, said method comprising:
    providing a circumferential rim on a first end of a fuel filler tube that includes a longitudinal axis, the circumferential rim extending radially outward from the first end and defining a non-planar cross-sectional shape, wherein the rim includes a sealing surface extending radially outward from the first end of the fuel filler tube;
    providing at least one catch member on an inner surface of an outer cover of a closure device assembly, the closure device assembly including an inner collar, wherein the outer cover and the inner collar define an annular gap;
    orienting a circumferentially-extending seal member on the closure device assembly, such that the seal member is axially spaced apart from the at least one catch member, wherein the seal member is coupled to a portion of the closure device via a circumferential notch defined in a radially outwardly-facing surface of said inner collar;
    coupling the closure device assembly to the fuel filler tube, wherein the circumferential rim is received in the annular gap after the closure device assembly is coupled to the fuel filler tube; and
    capturing the circumferential rim axially between the at least one catch member and the seal member such that the sealing surface sealingly engages the seal member.

9. The method in accordance with claim 8, wherein coupling the closure device assembly to the fuel filler tube comprises:

inserting the fuel filler tube into the closure device assembly until the circumferential rim contacts the at least one catch member; and applying a coupling force to the fuel filler tube and closure device assembly that is greater than a predetermined force to cause the circumferential rim to deflect an amount sufficient to enable the circumferential rim to pass the at least one catch member.

10. The method in accordance with claim 8, said method comprising orienting the cross-sectional shape of the circumferential rim as an arc extending an angle α, wherein α is greater than 90°.

11. The method in accordance with claim 8, said method comprising providing the seal member with a C-shaped cross-sectional shape.

12. The method in accordance with claim 11, said method comprising defining a flexible lip portion on the seal member.

13. The method in accordance with claim 12, said method comprising orienting the flexible lip portion toward the circumferential rim.

14. The method in accordance with claim 8, said method comprising providing the at least one catch member with a wedge-shaped shape to cause the circumferential rim to resiliently deflect when the closure device assembly is coupled to the fuel filler tube.

\* \* \* \* \*